Nov. 18, 1924.

J. TUSCHER

AIRPLANE 1,516,221

Original Filed Jan. 8, 1923   2 Sheets-Sheet 1

Jacob Tuscher
INVENTOR

BY
ATTORNEY

WITNESS:

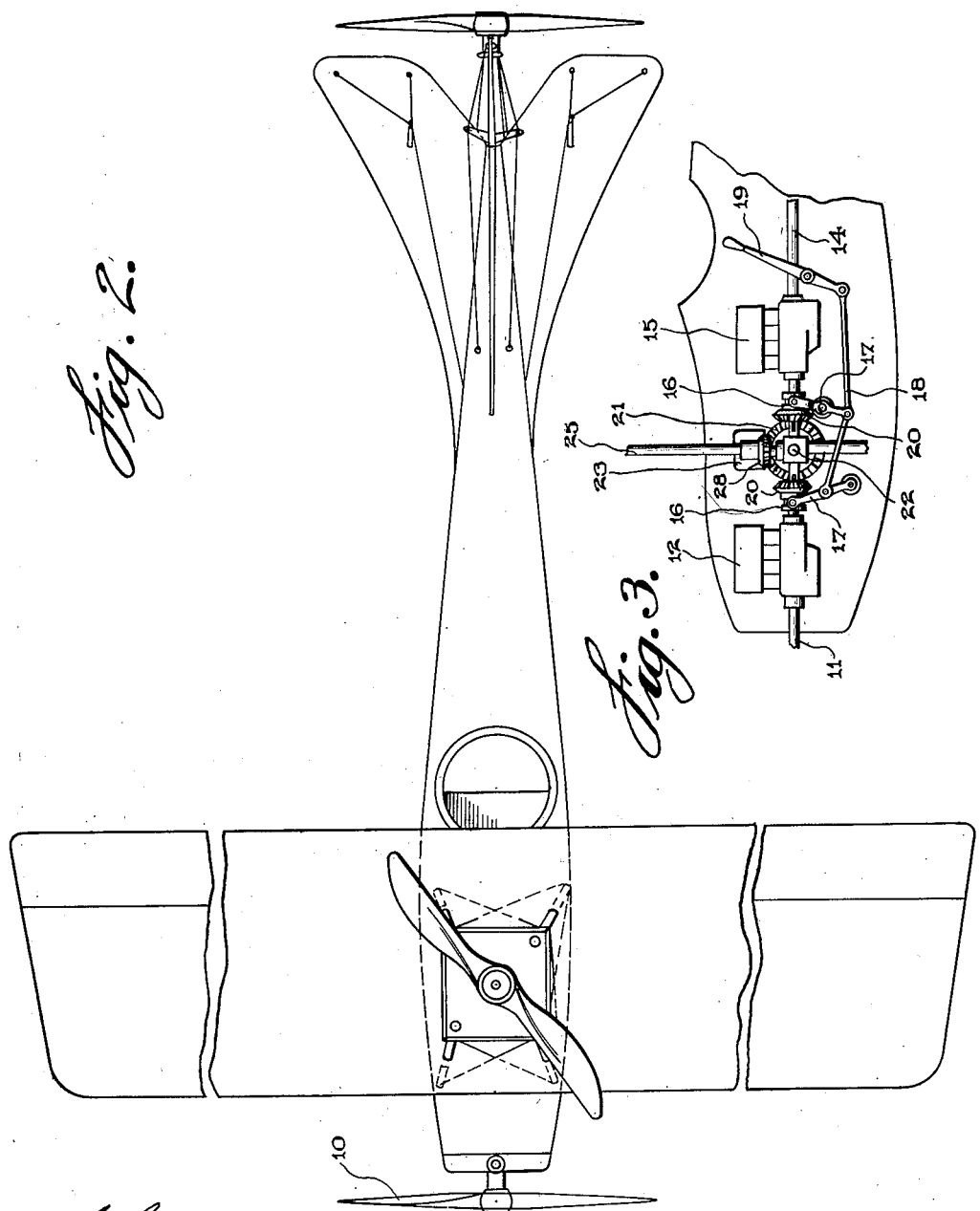

Patented Nov. 18, 1924.

1,516,221

UNITED STATES PATENT OFFICE.

JACOB TUSCHER, OF ALTON, ILLINOIS.

AIRPLANE.

Application filed January 8, 1923, Serial No. 611,354. Renewed July 1, 1924.

*To all whom it may concern:*

Be it known that I, JACOB TUSCHER, a citizen of the United States, residing at Alton, in the county of Madison and State of Illinois, have invented new and useful Improvements in Airplanes, of which the following is a specification.

The present invention relates to airplanes, and has for its chief characteristic, the provision of a plurality of independently operated propellers, one of which is arranged to lift the airplane straight upwardly, thereby eliminating the necessity of propelling the plane on the ground before the rise.

Another object of the invention resides in the provision of an airplane constructed in the manner above stated, and wherein the locomotive power for the different propellers can be coupled with the shaft of the forward propeller to increase the speed of the plane forwardly.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:

Figure 2 is a top plan view.

Figure 3 is a fragmentary view, partly in section showing the clutch mechanism.

Figure 1:
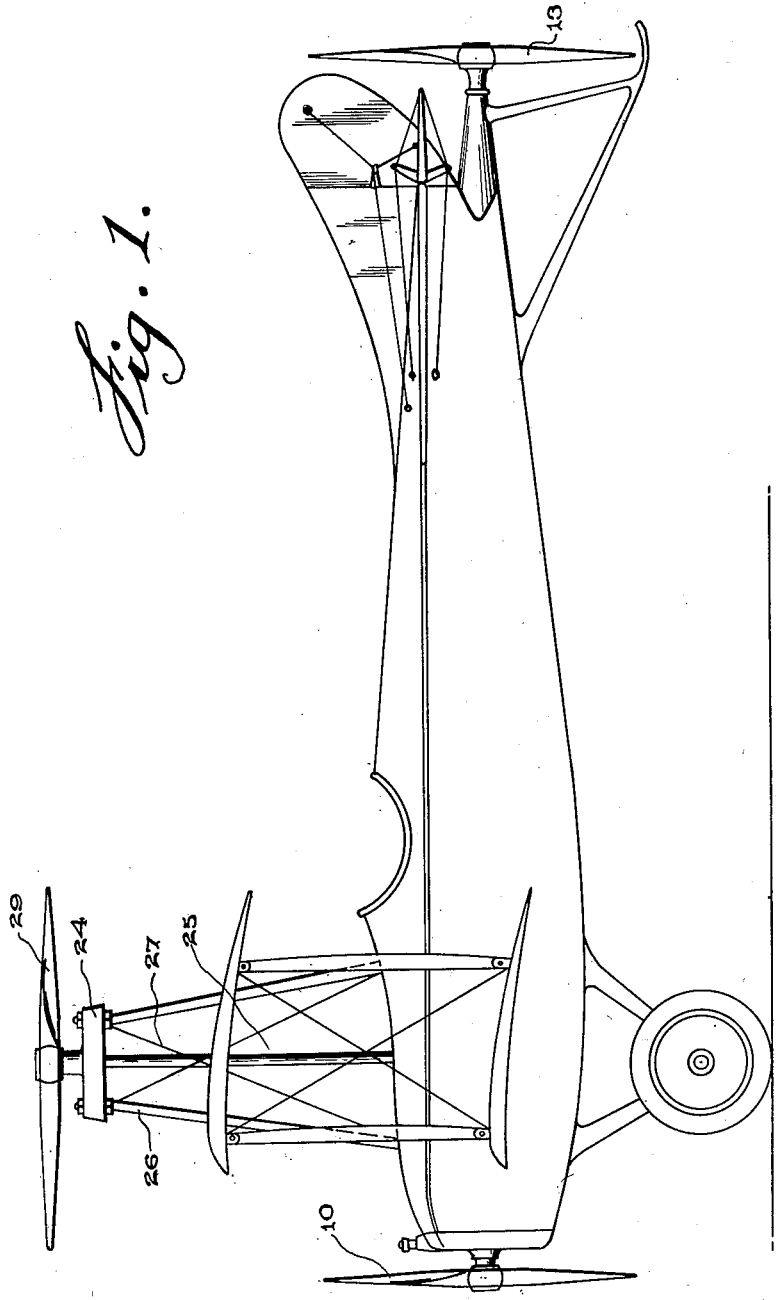
Figure 1 is a perpendicular rise of an airplane constructed in accordance with the present invention.

Referring to the drawings in detail, A indicates an airplane of wellknown construction, and wherein 10 represents the forward propeller including a shaft 11 which is driven by a motor 12. The rear propeller is indicated at 13, and includes a shaft 14, which is operated by means of a motor 15. Arranged between the motors is a clutch mechanism including the sliding collars 16 having associated therewith levers 17, and these levers are connected by means of a rod 18 to a main operating lever 19, so that the collars are shifted simultaneously. The collars operate to move the bevelled gears 20 into and out of mesh with a large bevelled gear 21 carried by the shaft 22 of a motor indicated at 23.

Arranged above the plane is a plate 24 of suitable dimensions, and this plate forms a bearing for the propeller shaft 25. The plate is supported horizontally by a suitable supporting structure 26 which is braced by stay rods 27. The vertical propeller shaft 25 carries at its lower end a bevelled gear 28 which meshes with the gear 21, so that the propeller 29 is operated by the motor 23, independently of the other propellers initially, and is arranged to lift the air plane straight upwardly off the ground or surface, thereby eliminating the necessity of moving the machine forwardly an appreciable distance before rising. After the plane has been elevated, the lever 19 may be operated to throw the gears 20 of the front and back propellers into working engagement with the gear 21, so as to increase the power and speed of the plane when moving upwardly.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

An airplane comprising a body portion, front and rear propellers having aligned shafts, a motor for independently driving each of said shafts, said motors arranged in alignment and spaced apart, a vertically disposed propeller shaft and propeller therefor, a motor arranged at right angles to the first named motors and having a shaft extending at right angles to said first named shafts, a driving connection between the third named motor and the vertical propeller shaft, and a means carried by each of the motor shafts of the motors first named whereby all of said motors may be coupled for driving the airplane forwardly.

In testimony whereof I affix my signature.

JACOB TUSCHER.